I. HECHENBLEIKNER.
PACKING BLOCK FOR ABSORPTION TOWERS.
APPLICATION FILED NOV. 23, 1914.

1,173,187. Patented Feb. 29, 1916.

WITNESSES

INVENTOR
Ingenuin Hechenbleikner
BY
Meyers, Cushman & Rea
ATTORNEYS

UNITED STATES PATENT OFFICE.

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

PACKING-BLOCK FOR ABSORPTION-TOWERS.

1,173,187.

Specification of Letters Patent. Patented Feb. 29, 1916.

Application filed November 23, 1914. Serial No. 873,569.

*To all whom it may concern:*

Be it known that I, INGENUIN HECHENBLEIKNER, a subject of the Emperor of Austria-Hungary, residing at Charlotte, in the county of Mecklenburg and State of North Carolina, have invented new and useful Improvements in Packing-Blocks for Absorption-Towers, of which the following is a specification.

This invention relates to the packing of absorption towers such as used in industrial plants usually for effecting an intimate contact between the gas and the liquid. In the present instance, I have applied the invention to the packing of an absorption tower which is employed for effecting an absorption of an acid such as sulfuric acid, nitric acid, and hydrochloric acid, etc.

A principal object of the invention is to produce a packing block having a form enabling it to be readily built into a packing in a tower, but which will present a very large superficial area.

Ordinary bricks are now used largely as a packing in such towers, and one of the objects of the present invention is to produce a block which can be substituted for an ordinary brick but which will give a much larger exposed interior area to the tower.

The invention consists in the general combination of parts and those features hereinafter described, all of which contribute to produce an efficient packing block and tower packing.

A preferred embodiment of my invention will be particularly described in the following specification while the broad scope of my invention will be pointed out in the appended claims.

Figure 1:
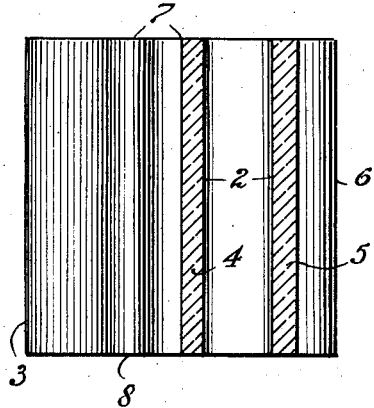
Figure 3:
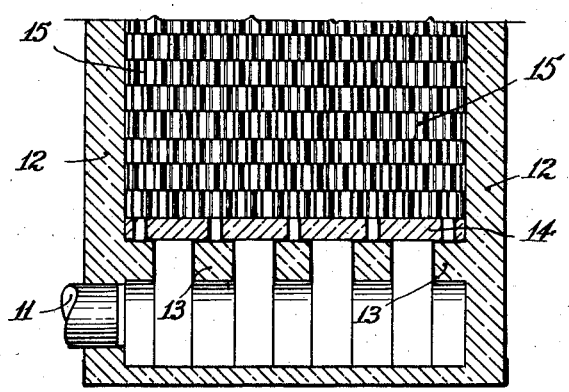
Figure 2:
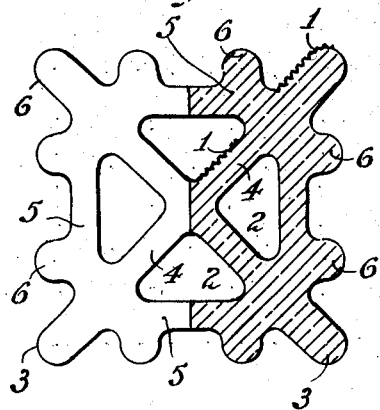
Figure 4:
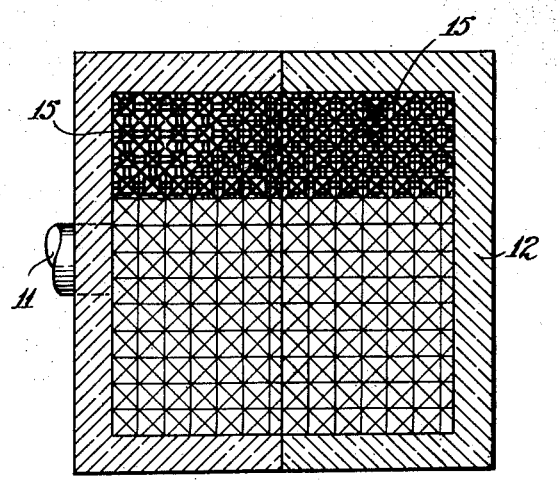

In the drawings:—Figure 1 is a side elevation and partial section through a block embodying my invention. Fig. 2 is a plan and partial cross section through this block. Fig. 3 is a vertical section taken through the lower portion of a tower having a packing of blocks embodying my invention and arranged in the tower in accordance with my invention. Fig. 4 is a horizontal cross section through the tower shown in Fig. 3, one-half of the view being represented as a section through a certain layer or row of blocks, and the other half of the view representing the section as taken through an adjacent row or layer of the blocks.

Referring more particularly to the parts, and particularly to Figs. 1 and 2, the block is preferably formed of a plurality of substantially vertical or side walls 5 which are preferably four in number, parallel with the central axis of the block, as illustrated, and the opposite pairs of walls are parallel with each other so that the block has substantially the form of a parallelepiped, the end faces 7 and 8 being at right angles to the axis of the block. The space surrounded by the walls 5 is divided preferably by webs 4 so that a plurality of passages 2 are formed, extending through the block from the upper horizontal face 7 to the lower horizontal face 8. Furthermore, at the corners of each block where the side faces meet, I provide outwardly extending projections or ribs 3 which preferably extend on the extended diagonal line of the blocks, and between the corner ribs 3 I prefer to provide other projections or ribs 6 on the vertical faces, which are intermediate of the ribs 3. The ends of these ribs are preferably of rounded form as shown, and the block as viewed in plan, presents a substantially rectangular or square outline, if such an outline is drawn connecting the extremities of the corner ribs. The ribs 3 and 6 all extend longitudinally with and preferably substantially parallel with the axis of the block, that is the projections all extend in the same direction on the faces of the block.

While I prefer to employ the webs 4 because they greatly strengthen the blocks, I may simply form projections on the interior of the walls to give the increased area which I desire. Furthermore, in order to further increase the superficial area of the block, I prefer to provide the interior and exterior thereof with corrugations such as illustrated at 1 in Fig. 2.

I prefer to make the end faces, that is upper and lower faces 7 and 8 plain, that is, they preferably have no projections. This arrangement facilitates the blocks being built into a packing such as that illustrated in Figs. 3 and 4, said packing being laid without mortar in a tower 12, and supported on suitable arches 13.

In building the packing in the tower, I prefer to apply the blocks in horizontal layers or rows piled one upon the other in succession, and I prefer to arrange the blocks of adjacent rows out of axial alinement with each other. That is, the blocks of the adjacent rows are preferably staggered with respect to each other. This staggering is preferably such that the center line of a block in a certain row comes about on the plane of meeting of the sides of blocks of an adjacent row. It is understood that these blocks are laid or built into a tower with the ribs 6 extending in an up and down or substantially vertical direction, but the faces 7 and 8 are horizontal.

In the illustration, 11 represents an inlet or outlet for the gas which passes through the passages 2 of the packing, and it is understood that the liquid which is to come in contact with the gas is admitted above and trickles down through the tower. In this connection, attention is called to the fact that when the blocks are built into the tower, the vertical passages 2 are greatly obstructed by the ribs of alternating rows or layers. This causes splashing and the formation of drops which increases the efficiency.

It is evident that a block embodying my invention presents a very greatly increased superficial area, and when built into a tower, such as that described, water trickling down must pass over a very large exposed surface. In this way very intimate contact of the gas and liquid must take place. While I prefer to form the blocks of acid resisting material, they may be formed of any material desired.

It is understood that the embodiment of my invention described herein is only one of the many embodiments or forms the invention may take, and I do not wish to be limited in the practice of my invention, nor in my claims, to the particular embodiment set forth.

What I claim is:—

1. A packing block for concentrating towers having a plurality of side walls disposed about and substantially parallel with a central axis, said block having end faces substantially at right angles to said axis, and having a plurality of projections extending on the faces of said side walls substantially longitudinally with said axis, said projections increasing the superficial area of said block.

2. A packing block for concentrating towers having a plurality of side walls disposed about and substantially parallel with a central axis, said block having end faces substantially at right angles to said axis, and having a plurality of projections extending on the faces of said side walls substantially longitudinally with said axis, said projections increasing the superficial area of said block, said block having a plurality of passages therethrough passing from one of the said end faces to the other.

3. A packing block for concentrating towers having a plurality of side walls disposed about and substantially parallel with a central axis, said block having end faces substantially at right angles to said axis, and having a plurality of projections extending on the faces of said side walls substantially longitudinally with said axis, said projections increasing the superficial area of said block, said block having a plurality of webs extending across the interior thereof, connecting said side walls and forming passages through the block from one of said end faces to the other.

4. A packing block for concentrating towers having a plurality of side walls disposed about and substantially parallel with a central axis, said block having end faces substantially at right angles to said axis, and having a plurality of projections extending on the faces of said walls substantially longitudinally with said axis, said projections increasing the superficial area of said block, said block having a plurality of webs extending across the interior thereof, connecting said side walls and forming passages through the block from one of said end faces to the other, said block having corrugations on the faces thereof further increasing the superficial area of the block.

5. A packing block for concentrating towers having four side faces disposed substantially parallel about a central axis, and having projections extending outwardly therefrom giving said block an increased superficial area, said projections including projections at the corners of said block extending substantially parallel with the axis of said block, the outline of said block taken over said corner projections being of substantially rectangular form.

6. A packing block for concentrating towers having four side faces, a plurality of projections extending outwardly therefrom and all extending in the same direction on said faces, giving said block an increased superficial area, said projections including projections at the corners of said block, the outline of said block taken over said corner projections being of substantially rectangular form, said projections also including intermediate projections on said vertical faces between said corner projections.

7. A packing block for concentrating towers of substantially parallelepiped form having four walls disposed substantially parallel about a central axis and having webs connecting said walls and forming passages between the end faces of said block, said block having ribs substantially at the corners thereof, extending between the end faces of said block.

8. A packing block for concentrating towers of substantially rectangular form having end faces having four walls disposed substantially parallel about a central axis and having webs connecting said walls and forming passages between and through the end faces of said block, said block having ribs at the corners thereof, disposed between the said end faces of said block, and intermediate ribs on the faces of said side walls between said corner ribs, said ribs and said webs giving said block an increased superficial area.

In testimony whereof I have hereunto set my hand in presence of two subscribing witnesses.

INGENUIN HECHENBLEIKNER.

Witnesses:
    W. H. MARTIN, Jr.,
    L. P. KILGORE.